May 30, 1933. C. W. VOGT 1,911,731
METHOD OF PROCESSING MATERIAL AND APPARATUS THEREFOR
Filed May 13, 1929 9 Sheets-Sheet 1
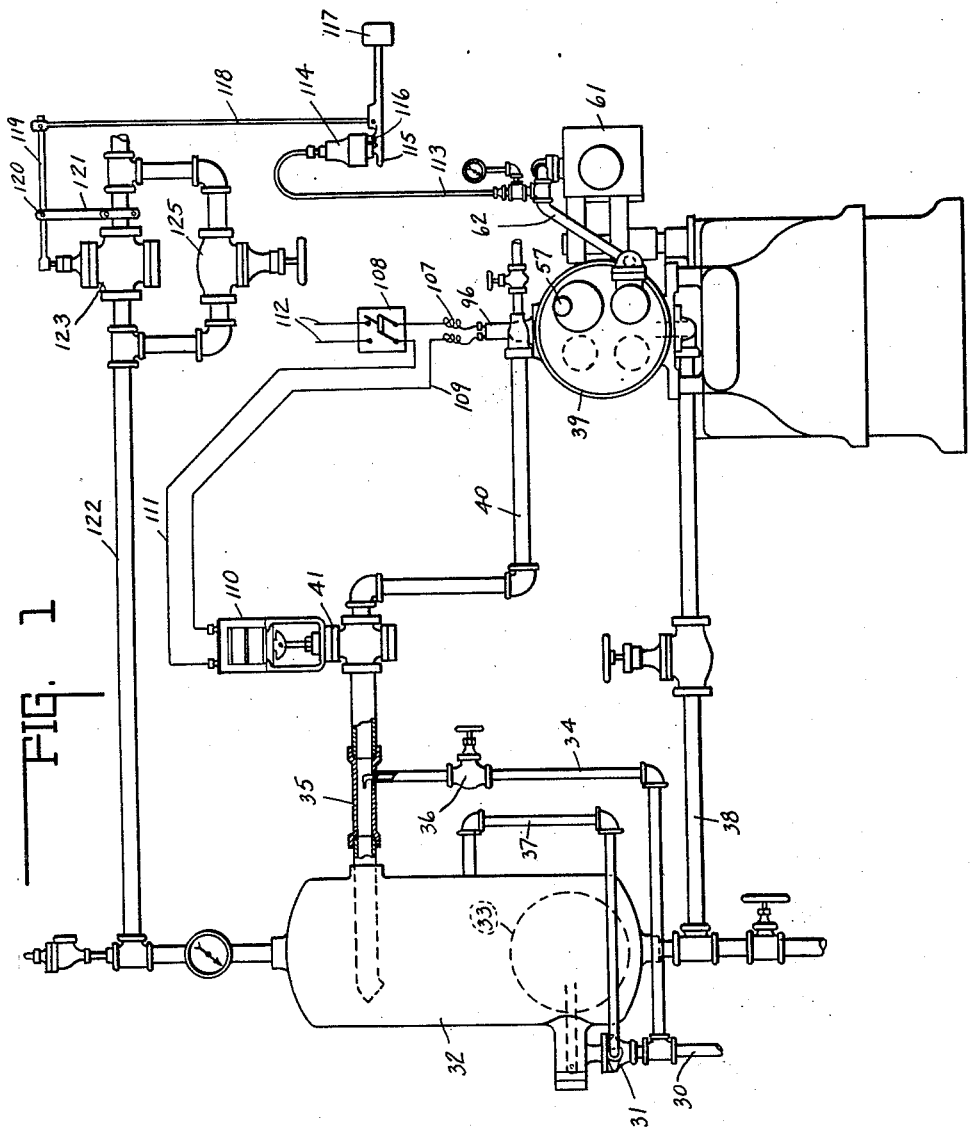
INVENTOR.
CLARENCE W. VOGT.
BY
ATTORNEYS.

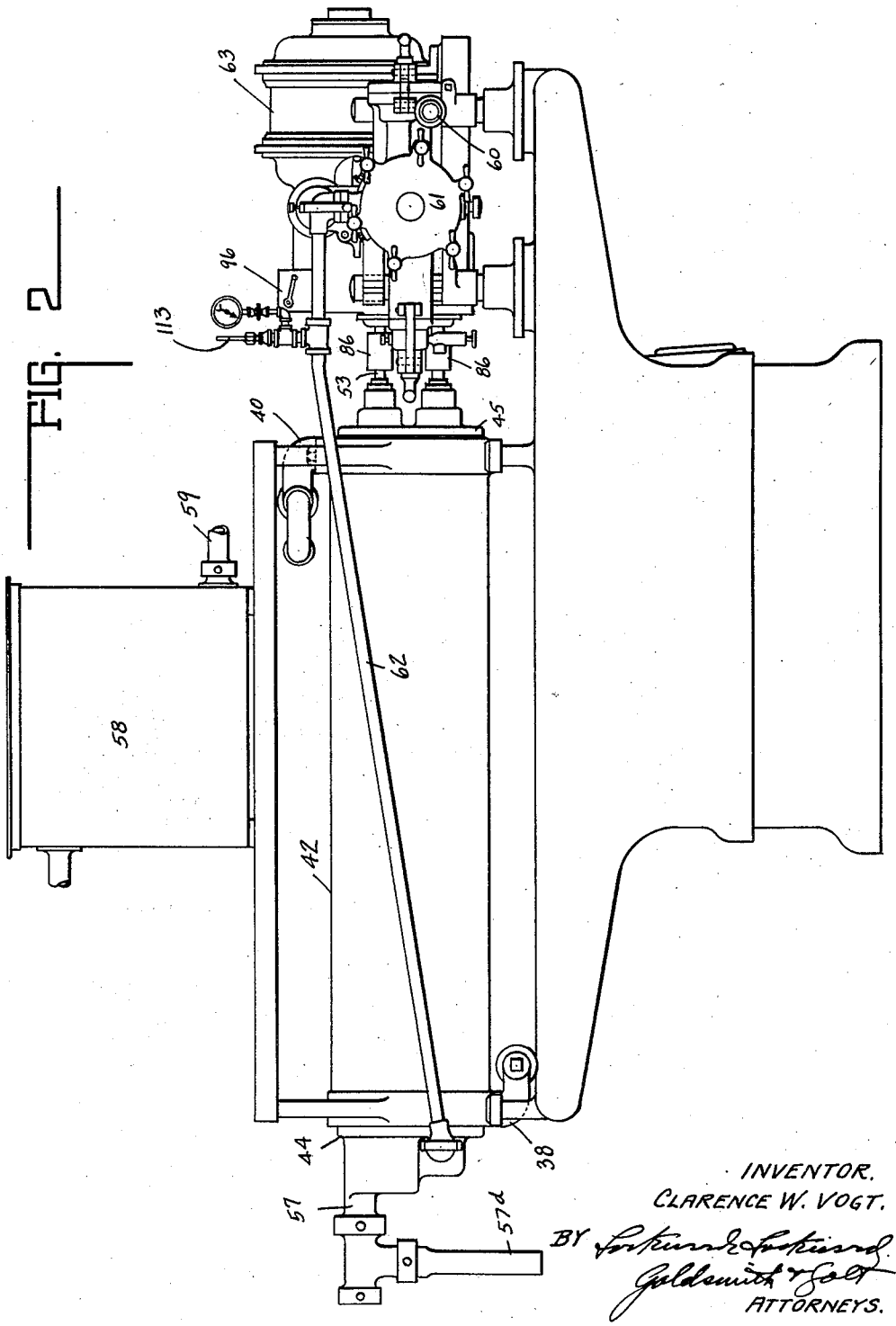

May 30, 1933.   C. W. VOGT   1,911,731
METHOD OF PROCESSING MATERIAL AND APPARATUS THEREFOR
Filed May 13, 1929    9 Sheets-Sheet 3
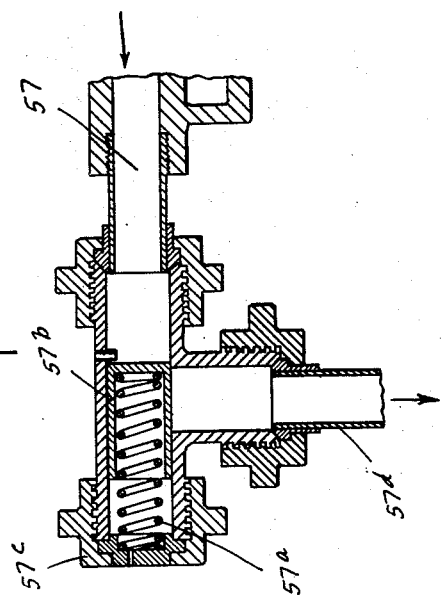
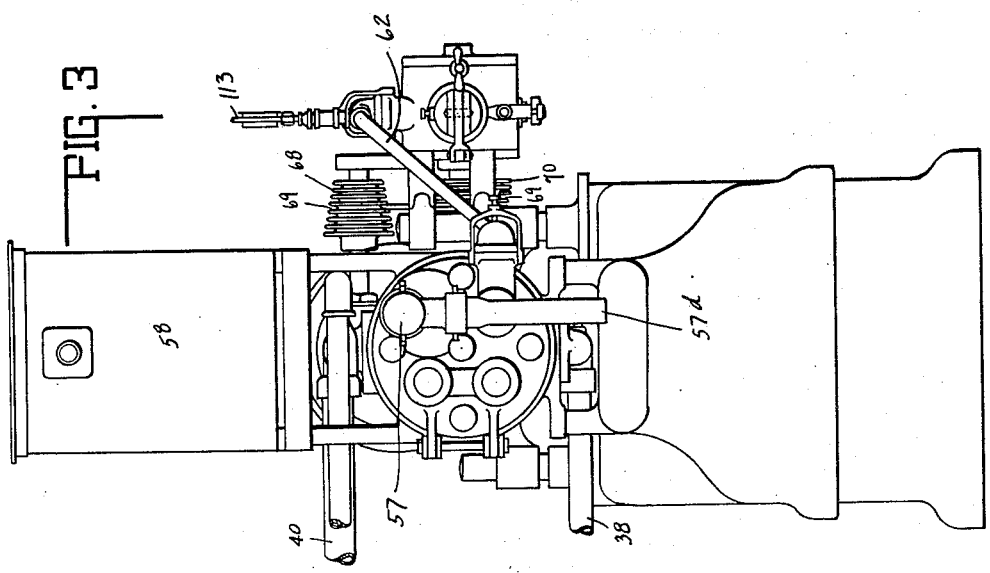
INVENTOR.
CLARENCE W. VOGT.
BY
ATTORNEYS.

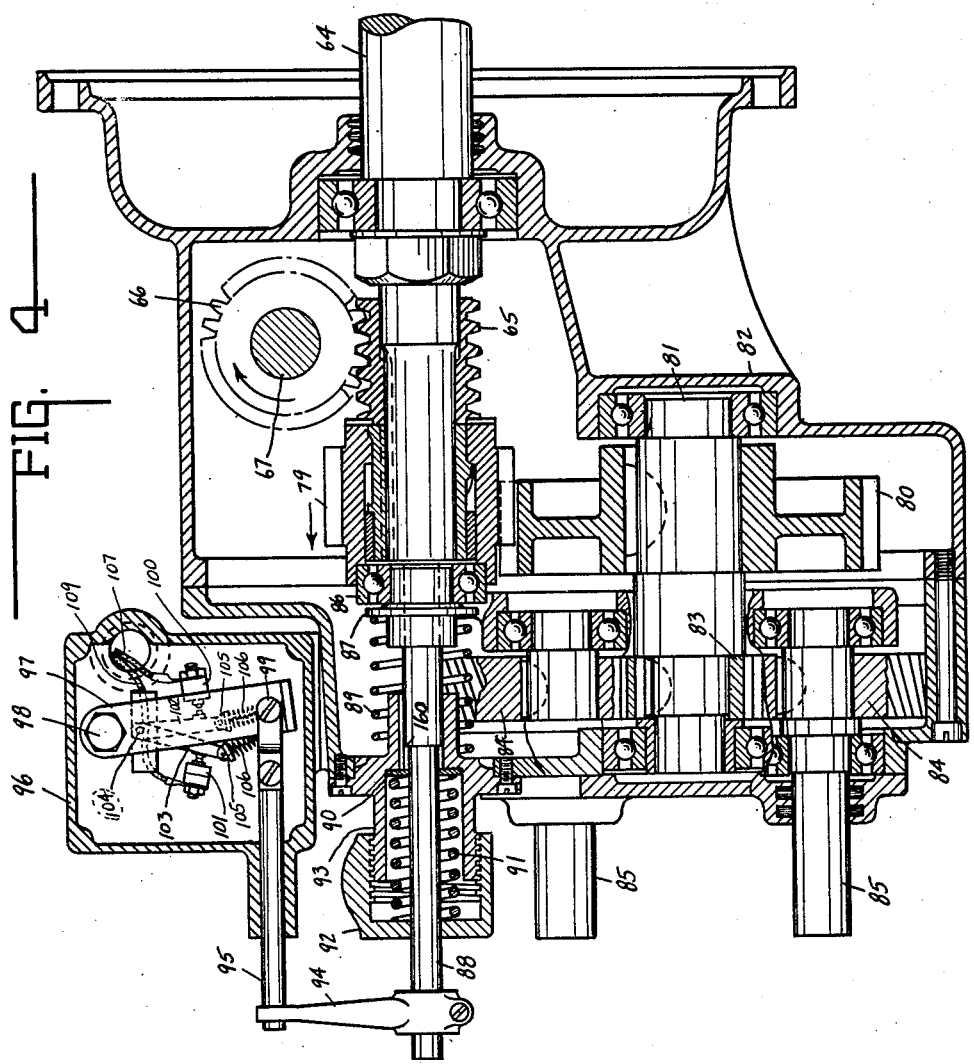

May 30, 1933. C. W. VOGT 1,911,731
METHOD OF PROCESSING MATERIAL AND APPARATUS THEREFOR
Filed May 13, 1929 9 Sheets-Sheet 5
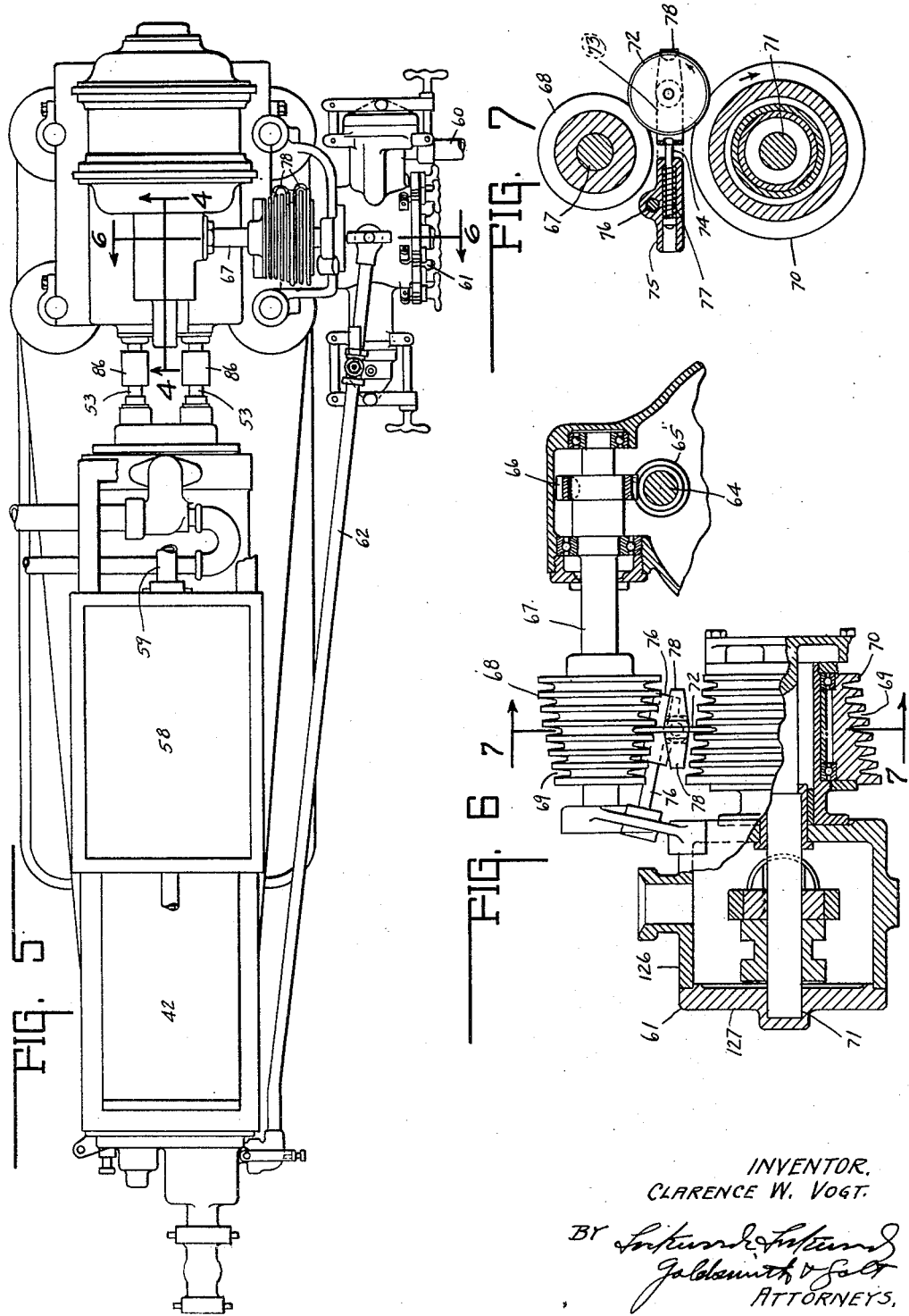
INVENTOR.
CLARENCE W. VOGT.
BY
ATTORNEYS.

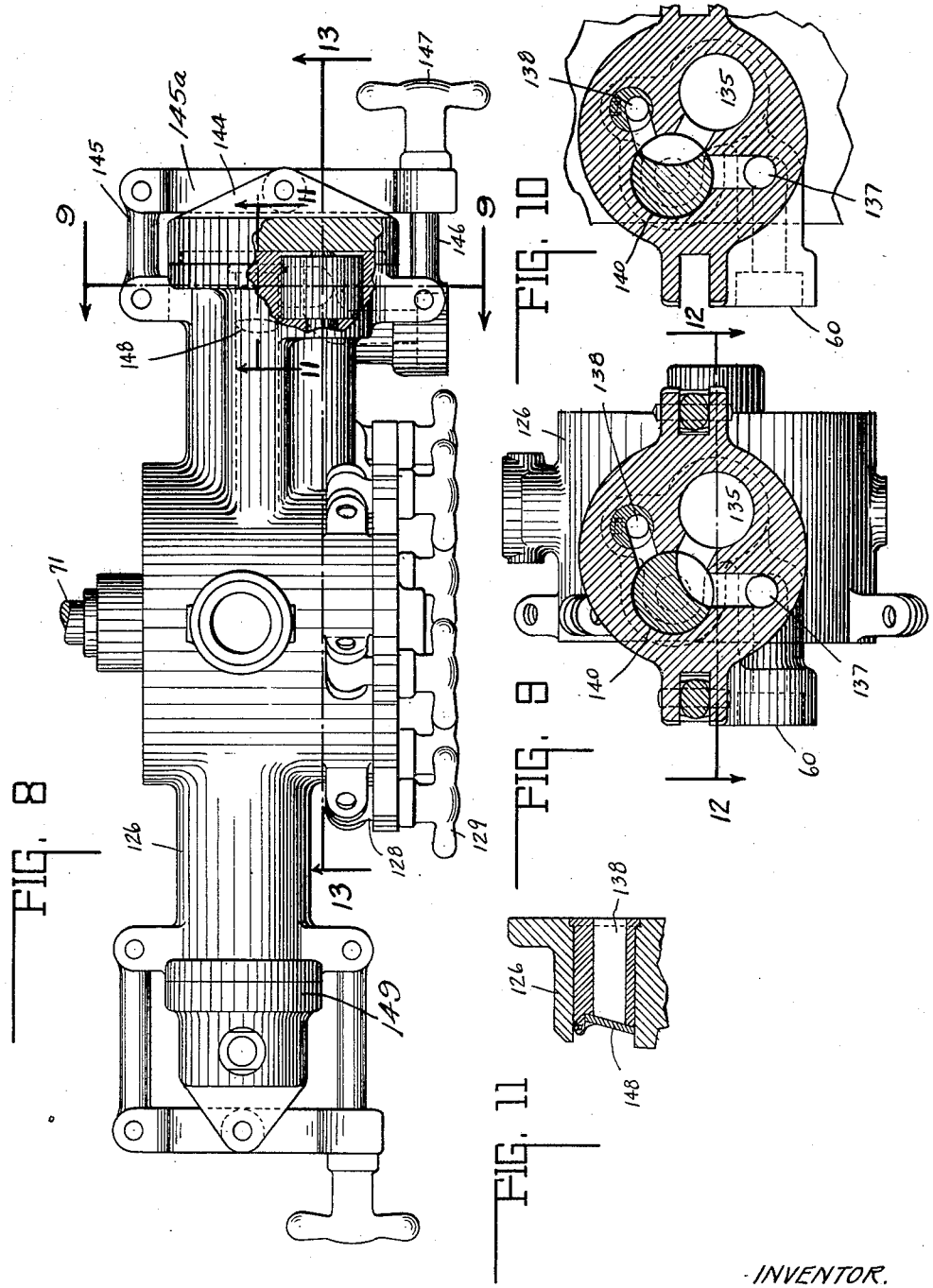

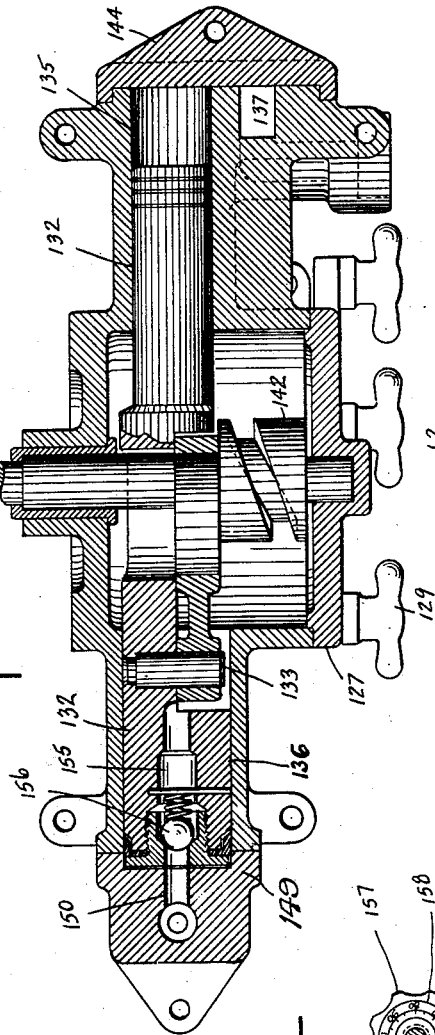

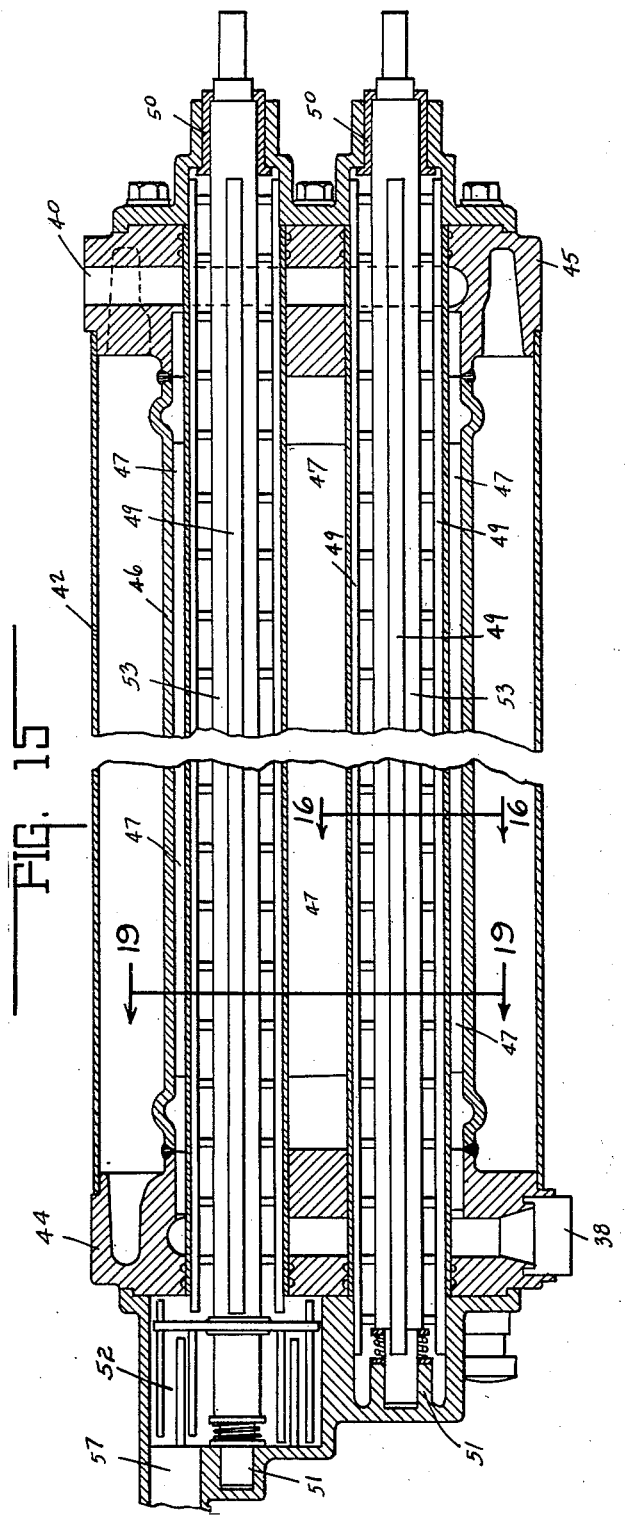
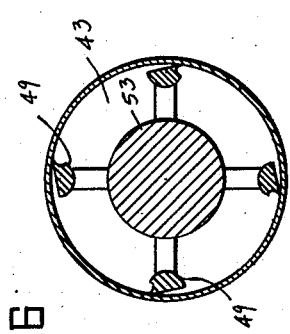

May 30, 1933.  C. W. VOGT  1,911,731
METHOD OF PROCESSING MATERIAL AND APPARATUS THEREFOR
Filed May 13, 1929  9 Sheets-Sheet 9
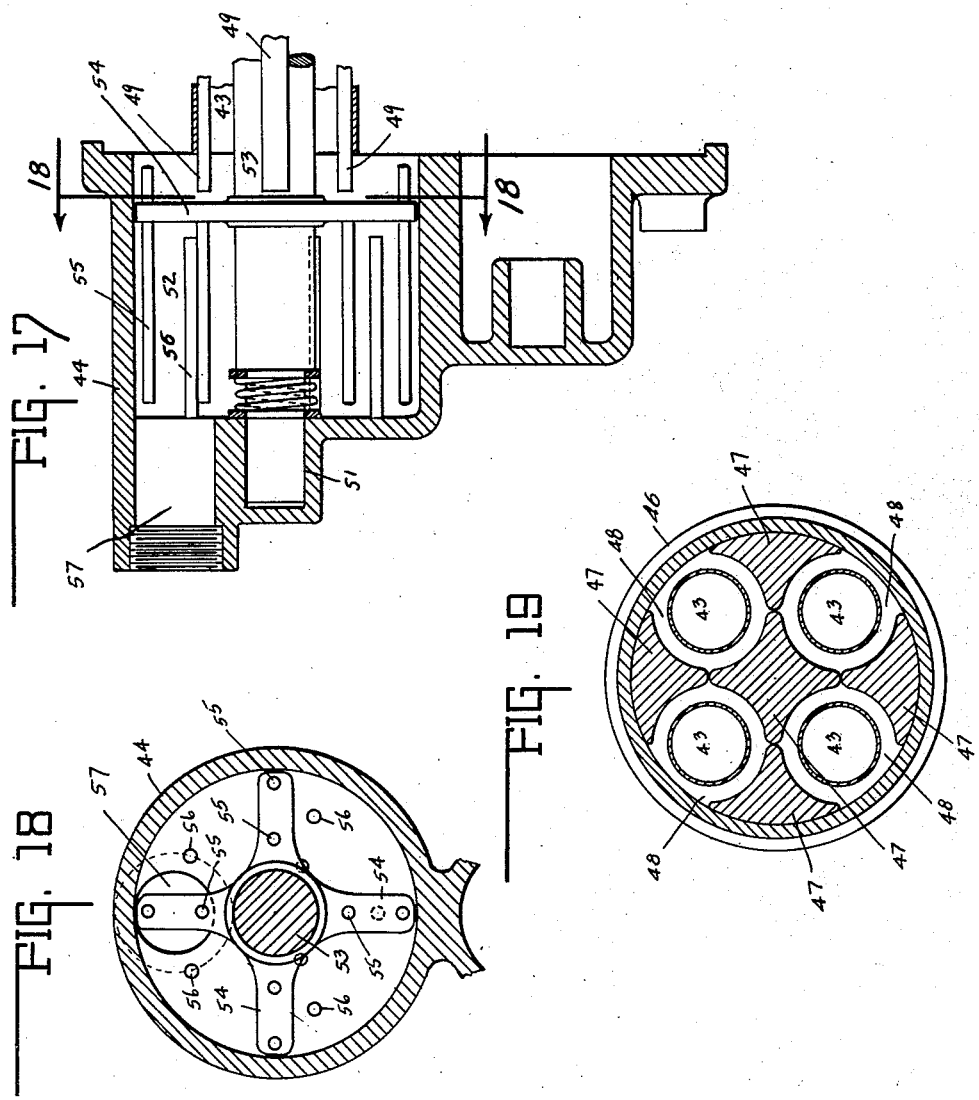
INVENTOR.
CLARENCE W. VOGT.
BY
ATTORNEYS.

Patented May 30, 1933

1,911,731

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION

METHOD OF PROCESSING MATERIAL AND APPARATUS THEREFOR

Application filed May 13, 1929. Serial No. 362,654.

This invention relates to a method and apparatus for processing materials, and particularly to the method of changing the physical characteristics of a material through a change of temperature combined with agitation and aeration.

The method of processing is not confined to any one material but is useful for a wide variety of products, such as ice cream, lard, oleomargarine, fruit juices, eggs and kindred materials. In the processing of certain of these materials, either agitation and aeration or both may be omitted without departing from certain features of the invention.

In processing certain material, it is desirable to lower the temperature during the processing while for others an increase of temperature is necessary. Certain features of the invention relate to either raising or lowering the temperature, although the following specifications are drawn more closely to refrigerating apparatus than to temperature-raising apparatus.

The object of this invention is to improve upon the efficiency of operation and method of processing materials and controlling the same as heretofore disclosed in my prior Patents Nos. 1,783,864; 1,783,865; 1,783,866; and 7,783,867, all issued December 2, 1930, and my co-pending application Serial No. 303,-832, filed September 4, 1928.

One feature of the invention resides in the provision of a method of augmenting the flow of the temperature-changing medium, thereby increasing the efficiency of heat transfer between the temperature-changing medium and the material under process. In the embodiment here shown for a refrigeration system, this is accomplished by the use of the velocity of the refrigerant in one part of the system to increase the velocity of flow of refrigerant over the refrigerating surface.

Another feature of the invention resides in a novel method and apparatus for the automatic control of the supply of temperature-changing medium responsive to the physical condition of the material under process. In my before mentioned prior patents, the temperature changing medium is controlled in accordance with the torque required to agitate the material in the process. In the present invention there is provided a control for the temperature changing medium operating in response to the general hydraulic pressure of the material under process as distinguished from the purely local pressures which might be set up in the material by the agitating members as disclosed in the said prior patents. In the appended claims, the term "hydraulic pressure" refers to this general hydraulic pressure and is intended to exclude the local pressures of the agitating members.

Other features of the invention and the full nature thereof will be understood from the attached drawings and the following description and claims:

In the drawings Fig. 1 is a diagrammatic view of the entire apparatus here shown applied to a refrigerating system for the manufacture of ice cream. Fig. 2 is a side elevation of the processing apparatus showing the method of drive of the agitation and of material supply. Fig. 3 is an end view of the discharge end of the processing chamber. Fig. 4 is a sectional detail of the driving mechanism for the agitators and includes the details of the control mechanism responsive to the physical condition of the material. Fig. 5 is a plan view of the processing chamber, driving mechanism and speed-changing apparatus. Fig. 6 is an enlarged detail of the speed-changing apparatus. Fig. 7 is a sectional detail of the same taken on the line 7—7 of Fig. 6. Fig. 8 is a plan view of the pump used for supplying material. Fig. 9 is a sectional view on the line 9—9 of Fig. 8 showing the valve mechanism of the said pump. Fig. 10 is a similar section to Fig. 9 showing the valve mechanism in another position. Fig. 11 is a sectional detail taken on the line 11—11 of Fig. 8. Fig. 12 is a horizontal section on the center line 12—12 of Fig. 9. Fig. 13 is a side elevation of the pump with the outer casing removed to show interior construction and with parts cut away to show the air intake for aeration of the material. Fig. 14 is a detail section taken on the line 14—14 of Fig. 13 and shows a regulating dial for regulating the amount of aeration of the product. Fig. 15 is a sectional view through the processing barrel taken on the center line of two of the processing chambers. Fig. 16 is a cross section of one of said processing chambers taken on the line 16—16 of Fig. 15. Fig. 17 is a sectional view of a whipping apparatus attached to the end of the last processing chamber and used in certain processes to give a final whip to the product. Fig. 18 is a cross section of the whipping chamber taken on the line 18—18 of Fig. 17. Fig. 19 is a cross section of the entire processing barrel taken on the line 19—19 of Fig. 15, and showing the relation of four processing chambers therein. Fig. 20 is a detail of a discharge device used to prevent loss of pressure in the final whipping chamber.

In the drawings the apparatus is represented as that required for the manufacture of ice cream or a similar product and the following detailed description is, therefore, confined to such a use. However, it is to be understood that the broad features of the invention are not to be limited by such a description.

In the drawings there is shown a conduit 30 which supplies a refrigerant at high pressure to a supply valve 31 and to a conduit 34. The refrigerant may be ammonia, carbon dioxide, sulphur dioxide, or other suitable refrigerant, but in the present apparatus ammonia is preferred. A portion of the refrigerant is conducted through the conduit 34 to the nozzle of an ejector 35 from which it is expanded, partially vaporized and discharged into an accumulator tank 32. The nozzle of the ejector is of such size that only a portion of the refrigerant necessary for the processing may be passed therethrough. The purpose of the ejector will be described hereinafter.

The supply valve 31 is associated with the accumulator tank 32 which contains a float 33. The float 33 is movable responsive to the level of liquid refrigerant contained in the accumulator to control the operation of the supply valve 31 as set forth in copending application Serial No. 303,832, filed September 4, 1928. From the supply valve 31 the refrigerant is carried through the conduit 37 in an expanded and partially liquefied condition and discharged into the accumulator 32. By this arrangement, a supply of liquid refrigerant is maintained in the accumulator at a practically constant level under the control of the float 33.

Connected to the bottom of the accumulator 32 is a conduit 38 adapted to supply liquid refrigerant to a processing apparatus 39 which will be described in more detail hereinafter. An outlet conduit 40 conducts the partially vaporized refrigerant through the solenoid-operated valve 41 and the ejector 35 back to the accumulator 32.

By the arrangement just described, the high velocity of the refrigerant leaving the nozzle of the ejector 35 causes a syphonic action, which creates a pressure differential in the conduit 40 and functions as a circulating medium to circulate the liquid refrigerant through the evaporator and back into the accumulator. This additional liquid flowing over the refrigerating surface serves to wipe the small bubbles from the refrigerating surface sooner than they would otherwise leave and thus more of the refrigerating surface is maintained in the wet condition and a higher co-efficient of heat transfer is thereby obtained. Experiments show that the co-efficient of heat transfer between a steel refrigerating surface and gaseous ammonia is less than one-half the corresponding co-efficient for liquid ammonia. The reduction in pressure in the conduit 40 also lowers the boiling point of the refrigerant within the evaporator and thereby still further increases the rate of heat transfer. By actual test this syphonic action has been found to increase the heat transfer of the evaporator more than 15% without changing the suction pressure of the gaseous refrigerant in the conduit 122, which connects the accumulator to the refrigerant pump for recompression.

By means of the valve 36 placed in conduit 34, the ejector action may be modified or completely eliminated. The valve therefore serves as a convenient means for regulating within limits the refrigerating effect within the evaporator. In case the valve 36 is completely closed all of the refrigerant which would otherwise pass through conduit 34 is by-passed through conduit 37.

The processing apparatus 39 is shown in more detail in Figs. 15, 16, 17, 18 and 19. It consists of an outer barrel 42 containing four processing chambers 43 suitably connected through cast heads 44 and 45 so that the material may flow through the four chambers in series. The heads 44 and 45 are connected by an inner shell 46 surrounding the four processing chambers. The space between shells 42 and 46 serves as a heat insulation. Inside the shell 46 and surrounding the individual processing chambers are members 47. A space 48 between the members 47 and the walls 43 serves as a jacket for the refrigerant and is connected with the refrigerant intake line 38 and outlet line 40.

Contained in each processing chamber 43 are agitators 49 carried on shafts 53 which are rotatable in suitable bearings 50 and 51 contained in the heads 45 and 44 respectively.

In the outlet of the last processing chamber is a whipping chamber 52 shown in detail in Fig. 17. A shaft 53 supports the agitator 49 for the processing chamber and also extends into the whipping chamber. Carried on the shaft 53 is a spider 54 which in turn carries pins 55. Stationary pins 56 are mounted in the housing 44 of the said chamber in the relation shown in Fig. 18, wherein each stationary pin is located to pass between pairs of rotating pins 55. By this construction the product is given its final whipping action upon leaving the last processing chamber 43.

The product is then discharged through a passage 57 against a piston 57$^b$, (see Fig. 20). A spring 57$^a$ abuts at one end against the inner surface of the piston 57$^b$ and at the other against a cap 57$^c$ which forms a closure for the chamber 57. When the pressure of the product is sufficient to overcome the pressure of spring 57$^a$ the piston is moved to uncover a passage 57$^d$ through which the product is discharged to a suitable container. This insures that the final whipping is done under pressure. The cap 57$^c$ may be adjusted to adjust the pressure of the spring to any desired value.

In Figs. 2, 3 and 5 there is shown a tank 58 in which there is maintained a supply of the material to be processed. A conduit 59 from this tank connects with the intake 60 of a pump 61. The outlet of the pump 61 is connected by a conduit 62 to the intake end of the first of the processing chambers 43. An electric motor 63 is connected by a gear mechanism shown in Figs. 4, 5, 6 and 7 to drive both the agitators and the pump 61. In Fig. 4 the shaft 64 of the motor 63 carries a worm 65 which engages with a worm gear 66 carried on the shaft 67.

Referring to Figs. 5 and 6 the shaft 67 carries a cone pulley 68 having a plurality of annular grooves 69 of varying diameters. A similar cone pulley 70 is carried on the shaft 71 which extends through the casing of the pump 61 for operating said pump. A disc 72 is placed in engagement with corresponding grooves of pulleys 61 and 70. The rotation of said pulleys is as indicated by arrows in Fig. 7 and the wedging action thereof when pulley 68 is the driving pulley and pulley 70 the driven pulley will tend to cause the disc 72 to remain in place as long as the pulleys are in motion in the direction indicated.

To prevent the disc from falling when the motor is stopped, a support 73 is provided carried upon a stem 74 in turn carried by a member 75. The member 75 is supported upon a shaft 76 and may be slid thereon to any desired position with relation to the cone pulley grooves 69. A spring 77 contained in the member 75 normally maintains the disc 72 in contact with the cone pulleys after the motor has stopped. A pair of handles 78 are attached to the support member 73 and are used in moving the disc from groove to groove. By this construction the speed of the pump may be easily and quickly varied without changing the speed of the driving motor.

Referring to Fig. 4 the motor shaft 64 carries a pinion 79. The pinion 79 in turn drives gear 80 mounted on shaft 81 which is carried in suitable bearings in the gear housing 82. Mounted on the shaft 81 is a pinion 83 meshing with pinions 84 carried on stub shafts 85. The stub shafts 85 are coupled by means of coupling 86, Figs. 2 and 5, to the shafts 53 which carry the agitators in the processing chamber. This gearing, therefore, forms a constant speed drive for the agitators.

The pinion 79 is of the torque-responsive type described in Patent No. 1,783,864, issued December 2, 1930, and tends to move longitudinally of its shaft in the direction of the arrow in Fig. 4 when torque is applied to the motor shaft. The pinion 79 abuts against the roller thrust bearing 86 which in turn abuts against a collar 87 fixedly carried upon a stem 88. A light flexible spring 89 abuts against the collar 87 at one end and against a portion of the gear housing at its opposite end and thereby resists the motion of said pinion. The strength of the spring 89 is so adjusted that the parts remain in the position shown in Fig. 4 so long as the motor is not in motion and move freely in the direction of the arrow as soon as power is applied to the motor.

The stem 88 carries an enlarged portion 160 adapted to abut against the central portion of a washer 90 which surrounds the reduced portion of the stem 88. A heavier coil spring 91 abuts at one end against the washer 90 and at the other end against an adjusting cap 92 which is screwed on to a projecting part 93 of the gear housing. In the normal operation of the processing machine the shoulder 160 is in contact with the washer 90 but the strength of the spring 91 is such that no further motion of the pinion 79 and the spring 89 takes place.

When the material in the processing chamber has reached a condition of plasticity which offers more than the normal resistance to the rotation of the agitators, the tendency toward movement of the pinion 79 increases sufficiently to compress the spring 91 and to continue the movement of stem 88 in the direction of the arrow.

Secured on the outer end of the stem 88 there is an arm 94 which is fixedly connected to a stem 95 which forms a part of an electric switch contained in the housing 96. Said switch consists of an arm 97 pivotally mounted at point 98 and pivotally connected at 99 to the end of the stem 95. Electrical contact members 100 and 101 are carried within the housing 96 and are suitably insulated therefrom. Contact arms 102 and 103 are pivoted at point 104 and suitably insulated from the housing 96. Arm 102 carries a contact adapted to engage contact member 100 and arm 103 carries a contact adapted to engage contact member 101. The contact arms 102 and 103 are electrically connected. Carried upon the lower end of each of the contact arms is a pivoted and insulated spring seat 105. A spring 106 is seated upon each of these spring seats and each spring abuts at its opposite end against a part of the arm 97.

In the operation of the above described switch, the contact between member 100 and arm 102 is broken when the switch is in the position shown in Fig. 4, that is, when the motor is not in operation. The starting of the motor initiates the motion of the pinion 79, as before described, which moves the stem 88 and consequently the arm 97. In the normal running position, the arm 97 assumes a substantially vertical position and in this position the arm 102 is flipped into contact with the member 100. Further motion of the stem 88, due to increased resistance to the motion of the agitators, moves the arm 97 still further to the left and causes the breaking of the contact between members 101—103. Thus there is a continuous connection between members 100 and 101 under normal running conditions and this connection is broken when the motor is not operating or when the resistance to agitation of the material has increased to a predetermined point. Adjustment of the tension of the spring 91 by means of the adjusting cap 92 allows the switch to operate when the material under process has reached any desired degree of plasticity.

Connected to the contact member 100 is an electric connection 107 connected at its other end to one pole of a double pole knife switch 108. Connected to the contact member 101 is an electrical connection 109 connected at its other end to one terminal of a solenoid 110 which operates the valve 41 in the refrigerant return line 40. An electrical connection 111 connects the opposite terminal of the solenoid 110 with the other pole of the switch 108. The switch 108 is connected to a suitable source of electrical energy by connections 112.

By the operation of this apparatus the valve 41 is instantly closed as soon as the physical condition of the material under process offers sufficient resistance to the agitation thereof to overcome the tension of the spring 91. The closing of the valve prevents the removal of gaseous refrigerant from the jackets surrounding the processing chambers and further vaporization of refrigerant in said jacket causes an increase of pressure therein which forces the liquid refrigerant backward through conduit 38 into the accumulator 32.

The removal of the liquid refrigerant and subsequent superheating of the gaseous refrigerant contained in the jacket results in a practical stoppage of the refrigerating action in the processing chambers. No further refrigerating action can thereafter take place until the physical condition of the material in the processing chamber has been sufficiently changed to reduce the torque required for agitation below the desired predetermined value.

When the motor is stopped the contact 100—102 is opened and the solenoid is operated to close the valve 41 and cause the stoppage of refrigeration. This action assures that there will be no freeze-up in the processing chamber due to accidental stoppage of the motor.

The knife switch 108 gives a convenient method of stopping the refrigeration by hand.

Connected to the discharge conduit 62 of the material pump 61 is a control conduit 113 connected at its other end to a pressure regulator 114. This pressure regulator may be of the type in which an increase of pressure in the control conduit causes the motion of a piston against a spring, the said motion being proportional to the degree of pressure applied. A common type of diaphragm regulator could also be used.

The regulator here shown is of the piston type in which a lever arm 115 is attached to a piston within the regulator body. The lever arm 115 is pivoted at 116 to the frame of the regulator 114 and is counterweighted at 117 by an adjustable counterweight. An increase of pressure in the conduit 113 responsive to pressure in conduit 62 acts upon the piston to raise the lever 115 in opposition to the weight of counterweights 117. By adjustment of the counterweights the critical pressure at which the lever arm will be raised may be adjusted to any desired value. Pivoted to the lever 115 there is a rod 118 pivotally attached at its other end to a lever 119. The lever 119 is pivoted at 120 upon a carrier 121 supported by a portion of the conduit 122. The conduit 122 is used for conducting gaseous refrigerant from the accumulator to the refrigerant pump for recompression. The opposite end of the lever 119 operates a valve 123 in the conduit 122.

By this structure an increase in the pressure of the material in conduit 62 above a predetermined value is transmitted through the conduit 113 to the pressure regulator 114. The pressure regulator causes motion of the lever 115 which operates to close the valve 123. A by-pass valve 125 is provided for by-passing the valve 123. By varying the opening of the by-pass valve the range of control of the regulated valve 123 may be adjusted within any desired limit.

In the processing of ice cream or other material which it is desired to congeal by cooling under agitation, the ingredients are stored in the tank 58 and pumped therefrom into the processing chamber through the conduit 62. At one end of the processing chamber the material will be in its original liquid condition and will gradually assume its congealed condition as it progresses through the chambers.

The pressure required to force the material through the chambers varies with the degree of congealing, being greater as the congealing increases.

By the operation of valve 123 responsive to the pressure required to force the material into the chamber, the flow of refrigerant is regulated to maintain a practically constant processing pressure and, therefore, a practically constant degree of congealing of the material. It is not necessary that the pressure connection be made at the point shown in the drawings since any point between the pump and the point in the processing chamber at which congealing commences will be at practically the same pressure and can, therefore, be used for controlling the pressure regulator.

In processing materials in which air or other fluid is to be mixed, it has been found that when an excess of air is supplied with the ingredients the percentage of air incorporated in a mix of given ingredients depends entirely upon the degree of stiffness obtained. Therefore, it is not necessary to accurately measure the air supplied with the ingredients in order to obtain the desired percentage of incorporation. It is only necessary to have sufficient volume of air present to permit the incorporation of the desired percentage and then to maintain the stiffness of the mix at a predetermined value. Thus, when the stiffness is uniformly maintained by the control apparatus herein described a very uniform weight of product is obtainable hour after hour,—a condition that has been heretofore impossible of obtention with the former type of equipment without mixing successive batches as they have been drawn from the freezer in order to approximate a uniform weight. While this subsequent mixing or the use of hoppers and blenders tends to increase the uniformity of weight of the product being produced on several machines simultaneously, it also makes an inferior product because of the softening which occurs with the subsequent mulling or mixing.

As an example, it has been found that with an ice cream freezer with an approximate hourly capacity of 250 gallons of ice cream and with a vanilla mix containing approximately 10% butter fat, 14% cane sugar and 12% serum solids, a pressure of approximately 44 pounds is sufficient to freeze the cream to the desired degree of stiffness with an incorporation of air producing a product 210% of the original volume of the mix. For different ingredients, it is necessary to alter the pressure to obtain the same percentage of incorporation, for example, when chocolate is added to the above mix, the pressure required to obtain the corresponding yield with the same machine has been found to be approximately 48 pounds. Thus it is possible, by altering the pressure, to accurately control the properties of mixes which hold the air less readily than others and which were formerly considered difficult to whip in a gravity type of freezer in which the unloading was done by the action of the agitator blades and which depended upon angularity and speed of the blades to discharge the frozen batch. The effect of variations in acidity, the apparent viscosity and many of the other changes which occur in dairy products due to variations in the seasonal feeding, etc., may be overcome by merely varying the pressure at which the product is processed.

If the rate of congealing progresses too rapidly to be controlled by the pressure regulated valve, the torque control, before described, comes into action to close valve 41 and completely stop the refrigeration action. If the refrigeration action is frequently stopped by this method, showing an excess of refrigeration for the quantity of material being supplied, the supply of material may be increased by means of the disc speed-changing device. Thus, an extremely sensitive, rapidly responsive and flexible method of control is established, which is fully automatic between set limits and semi-automatic between wider limits, with simple means of adjustment to cover variables which are to be encountered in the products to be processed and also variations in the quality and quantity of the refrigerant or heating agent.

The control is equally applicable to processing materials to be congealed by heating instead of refrigeration since the flow of steam or other heating medium may be controlled by valves operated in the same manner as those herein described for the control of refrigerant.

In processing material to be thinned by temperature change instead of congealed, the operation of the valves is reversed and more instead of less of the temperature-changing medium is supplied when the pressure of the material and its resistance to agitation is greater than normal.

In Figs. 8 to 14 inclusive there is shown a preferred form of pump used to supply the material to be processed to the processing chamber. In this form of pump a pump casing 126 is provided with a removable cover 127 which is secured in place by means of the pivoted studs 128 and the handle nuts 129 carried thereby. Carried on bearings in the pump housing and cover is the shaft 71 driven by the variable speed drive as previously described. Carried on the shaft 71 is an eccentric 130 operating an eccentric rod 131 which in turn is connected to a piston 132 by means of a connecting rod pin 133. Thus rotation of the shaft 71 imparts a reciprocating motion to the piston 132. The piston 132 extends on both sides of the shaft 71 and has an opening 134 therethrough for the passage of said shaft. One end of the piston 132 operates in a cylinder 135 used as a pump cylinder for the liquid ingredients of the mix. The opposite end of the plunger operates in a cylinder 136 used as a pumping cylinder for air, carbon dioxide or other desired fluid for aeration.

Adjacent the outer end of the cylinder 135 is a chamber 137 connected to the intake port 60 of the pump. A chamber 138 extends from a point in the housing 126 adjacent the outer end of the cylinder 135 to the central cavity 139 of the pump casing. A rotary valve 140 is associated with the cylinder 135 and the chambers 137 and 138 in such a manner that when the valve is in one position as shown in Fig. 9 a passageway is open between chamber 137 and the cylinder 135, and when the said valve is in another position as shown in Fig. 10, a passageway is open between the cylinder 135 and the chamber 138. The rotary valve 140 is carried on a stem 141 contained in the housing 126 and is rotated by means of a cam 142 carried on the shaft 71, and an arm 143 carried on said stem.

The operation of the valve is in timed relation with the reciprocation of the piston 132 so that on the intake stroke the valve is as shown in Fig. 9 and allows the passage of the mix from the intake port into the cylinder, while on the discharge stroke the valve is as shown in Fig. 10 and allows the discharge of the mix from the cylinder through the chamber 138 into the central cavity 139 of the pump casing and thence to the outlet conduit 62.

A removable cylinder head 144 closes the end of the cylinder 135 and associated chambers and is held in place by the links 145 and 145a, the pivoted stud 146 and the handle nut 147. Included in the chamber 138 is a check valve 148 shown in detail in Fig. 11 which prevents the return of the mix from the chamber 139.

The cylinder 136 is closed by a removable cylinder head 149 containing a chamber 150. A conduit 151 leads from the atmosphere or other fluid source to the said chamber and contains an orifice 152 partially closed by a needle valve 153. A spring-actuated ball valve 154 allows the passage of air from the said conduit into the chamber 150 when the pressure in said chamber is reduced below atmospheric pressure and prevents the return of air therethrough. The chamber 150 registers with a passage 155 in the piston 132. The passage 155 connects with the central cavity 139 of the pump casing and contains a spring-operated ball valve 156 which allows the passage of air from the chamber 150 into the cavity 139 when the pressure in said chamber is greater than the pressure in said cavity, but which prevents the return of air therethrough. Thus the intake stroke of the piston 132 lowers the pressure in the cavity 150 and draws air therein. The opposite stroke of the piston forces the air from the chamber 150 into the central cavity 139 where it is mingled with the other ingredients of the mix.

The adjustment of the needle valve 153 provides a convenient method of regulating the amount of air mixed with a given quantity of the other ingredients. This adjustment is accomplished by means of a hand wheel 157 carrying a graduated dial 158 associated with a stationary pointer 159.

While the aerating mechanism has been described as introducing atmospheric air into the mix, it is equally applicable to the introduction of other gases or fluids.

The invention claimed is:

1. A refrigerating machine including a source of high pressure refrigerant, an expansion means for expanding said refrigerant to a lower pressure and increasing the velocity thereof, an accumulator for liquid refrigerant, a refrigerating surface, a conduit for liquid refrigerant between said accumulator and said refrigerating surface, a return conduit for refrigerant between said refrigerating surface and said accumulator, an ejector in said last-mentioned conduit operable by the velocity of the expanding refrigerant from said expansion means to augment the velocity of flow of refrigerant from the refrigerating surface, and means for by-passing a portion of said high velocity refrigerant to control the ejector effect thereof.

2. A refrigerating machine including a source of high pressure refrigerant, an expansion means for expanding said refrigerant to a lower pressure and increasing the velocity thereof, an accumulator for liquid refrigerant, a refrigerating surface, a conduit for liquid refrigerant between said accumulator and said refrigerating surface, a return conduit for refrigerant between said refrigerating surface and said accumulator, an ejector in said last-mentioned conduit operable by the velocity of the expanding refrigerant from said expansion means to augment the velocity of flow of refrigerant from the refrigerating surface, and means for by-passing said high velocity refrigerant to stop the ejector effect thereof.

3. The method of treating material in a closed chamber having a temperature changing medium associated therewith which includes utilizing the hydraulic pressure of the material in said chamber to control the temperature changing medium.

4. The method of treating material in a chamber having a temperature changing medium associated therewith which includes utilizing the hydraulic pressure required to advance said material through said chamber to control the temperature changing medium within predetermined limits.

5. The method of congealing material within a chamber by refrigeration which includes utilizing the pressure required to advance the material through said chamber to control a refrigerant between predetermined limits.

6. The method of processing material in a chamber having a temperature changing medium associated therewith, which includes utilizing the pressure required to advance said material through said chamber to control said temperature changing medium within predetermined limits and utilizing the resistance of said material to movement in said chamber to control the effective action of said temperature changing medium beyond said limits.

7. The method of processing material in a chamber having a temperature changing medium associated therewith, including utilizing the hydraulic pressure of the material being processed to control said medium and automatically cutting off the supply thereof when predetermined resistance to the movement of said material in the chamber is reached.

8. In an apparatus for treating material including a processing chamber in which the material is treated, means for changing the temperature of the material therein, and means controlled by the hydraulic pressure of the material in said chamber for controlling said temperature changing means.

9. An apparatus for processing material including a processing chamber in which the material is processed, means for changing the temperature of the material therein, means for forcing said material therethrough, and means controlled by the pressure required to force the material through said chamber for controlling said temperature changing means.

10. An apparatus for processing material including a processing chamber having a temperature changing medium associated therewith, and a valve responsive to the hydraulic pressure of the material being processed for controlling the said temperature changing medium.

11. An apparatus for processing material including a processing chamber having a temperature changing medium associated therewith, a valve for controlling said medium, means for forcing the material to be processed through said chamber, and a regulator responsive to the hydraulic pressure of material in said chamber for controlling said valve.

12. A refrigerating machine including a source of supply of high pressure refrigerant, an accumulator, an expansion means for expanding said refrigerant to a lower pressure for delivery to said accumulator in a partially liquefied condition, a refrigerating chamber having a jacket for said refrigerant, a conduit for conducting liquid refrigerant from said accumulator to said jacket, a second conduit for conducting refrigerant from said jacket to said accumulator, a third conduit for conducting gaseous refrigerant from said accumulator and returning the same to the source of high pressure refrigerant for recompression, and a valve in said last mentioned conduit operable by the pressure required to advance the material to be refrigerated through the refrigerating chamber to control the flow of refrigerant therethrough.

13. A refrigerating machine including a source of supply of high pressure refrigerant, an accumulator, an expansion means for expanding said refrigerant to a lower pressure for delivery to said accumulator in a partially liquefied condition, a refrigerating chamber having a jacket for said refrigerant, a conduit for conducting liquid refrigerant from said accumulator to said jacket, a second conduit for conducting refrigerant from said jacket to said accumulator, a third conduit for conducting gaseous refrigerant from said accumulator and returning the same to the source of high pressure refrigerant for recompression, an ejector in said second mentioned conduit operable by the velocity of the expanded refrigerant from the expansion means to facilitate the removal of gaseous refrigerant from the said jacket, and a valve in said last mentioned conduit operable by the pressure required to advance the material to be refrigerated to control the flow of refrigerant therethrough.

14. An apparatus for processing material including a processing chamber, means for forcing material therethrough to be processed, means for agitating said material while in process, means for supplying a temperature changing medium to said processing chamber, a valve responsive to the pressure required to advance said material for controlling the said temperature changing medium, and a second valve responsive to the torque required to agitate said material for stopping the flow of said temperature changing medium when said torque is equal to a predetermined value.

15. An apparatus for processing material including a processing chamber, means for forcing material therethrough to be processed, means for supplying a temperature changing medium to said processing chamber, a valve responsive to the pressure required to advance said material for regulating the said temperature changing medium, and a second valve operable in response to the physical condition of the material in the processing chamber for stopping the flow of said temperature changing medium.

16. A refrigerating apparatus including a refrigerating chamber having a jacket for a circulating refrigerant, an accumulator, a source of high pressure refrigerant, an expansion means for expanding said refrigerant and delivering the same to the accumulator in a partially liquefied condition, a conduit for delivering liquid refrigerant from said accumulator to said jacket, a second conduit for delivering refrigerant from said jacket to said accumulator, a third conduit for returning gaseous refrigerant from said accumulator to the source of high pressure refrigerant for recompression, a valve in said second mentioned conduit responsive to the condition of the material under refrigeration for controlling the flow of refrigerant therethrough, an ejector in said second mentioned conduit operable by the velocity of the expanded refrigerant for augmenting the flow of refrigerant therethrough, and a valve in said third mentioned conduit responsive to the pressure of the material under refrigeration for regulating the flow of refrigerant therethrough.

17. A refrigerating machine including an accumulator, an evaporator, a conduit conducting liquid refrigerant from said accumulator to said evaporator, a conduit returning refrigerant from said evaporator to said accumulator, an ejector in said last-mentioned conduit operable by expansion of refrigerant to increase the flow of refrigerant therein, an expansion valve, a conduit supplying high pressure liquid refrigerant to said expansion valve and to said ejector, a conduit conducting expanded refrigerant from said expansion valve to said accumulator, and a float-operated mechanism responsive to the level of liquid refrigerant in the accumulator for controlling the passage of refrigerant through said expansion valve, whereby necessary refrigerant in excess of that supplied through said ejector is supplied through said expansion valve.

18. The process of refrigeration consisting in supplying the quantity of liquid refrigerant required for operation of a refrigerating system at a relatively high pressure, expanding said refrigerant to a lower pressure, increasing the velocity of a predetermined portion thereof by said expansion, and utilizing the increased velocity of said portion to increase the rate of flow of refrigerant over a heat transfer surface.

19. The process of refrigeration consisting in supplying the quantity of liquid refrigerant required for operation of a refrigerating system at a relatively high pressure, expanding said refrigerant to a lower pressure, increasing the velocity of a predetermined portion thereof by said expansion, and utilizing the increased velocity of said portion to facilitate removal of vaporized refrigerant from the heat transfer surface.

20. The process of refrigeration consisting in supplying the quantity of liquid refrigerant required for operation of a refrigerating system at a relatively high pressure, expanding said refrigerant to a lower pressure, increasing the velocity of a predetermined portion thereof by said expansion, and utilizing the increased velocity of said portion to complete a pressure drop in the passage of a refrigerant over a heat transfer surface.

21. An apparatus for processing material including a processing chamber having a temperature-changing medium associated therewith, a valve responsive to the pressure of the material being processed for controlling the effective action of said temperature-changing medium between predetermined limits, and a by-pass about said valve for determining said limits.

22. The method of processing material to effect rapid and minute crystallization of at least a portion thereof including passing the material through a processing chamber having a temperature-changing medium associated therewith, continuously agitating said material throughout all parts of its path of flow where exposed to the action of said medium, and automatically controlling the said medium in accordance with the hydraulic pressure of the material within the chamber.

23. The method of processing material to effect rapid and minute crystallization of at least a portion thereof including passing the material through a processing chamber having a temperature-changing medium associated therewith, continuously agitating said material throughout all parts of its path of flow where exposed to the action of said medium, and automatically controlling the said medium in accordance with the pressure required to advance the material through the chamber.

24. The method of processing material to effect rapid and minute crystallization of at least a portion thereof including passing the material through a processing chamber having a temperature-changing medium associated therewith, continuously agitating said material throughout all parts of its path of flow where exposed to the action of said medium, and automatically controlling the said medium within predetermined limits in accordance with the hydraulic pressure of the material within the chamber.

25. The method of processing material to effect rapid and minute crystallization of at least a portion thereof including passing the material through a processing chamber having a temperature-changing medium associated therewith, continuously agitating said material throughout all parts of its path of flow where exposed to the action of said medium, and automatically controlling the said medium within predetermined limits in accordance with the pressure required to advance the material through the chamber.

26. The method of processing material in a chamber having a temperature-changing medium associated therewith, consisting in mechanically agitating said material while in the chamber, utilizing the pressure required to advance the material through the chamber to control the said temperature-changing medium between predetermined limits and utilizing the resistance to agitation offered by the material in the chamber to control the effective action of said temperature-changing medium beyond said limits.

27. The method of processing material in a chamber having a temperature-changing medium associated therewith, consisting in mechanically agitating the material while in the chamber, utilizing the hydraulic pressure of the material under process to control the temperature-changing medium, and automatically cutting off the supply thereof when a predetermined resistance to agitation of said material is reached.

In witness whereof, I have hereunto affixed my signature.

CLARENCE W. VOGT.